United States Patent [19]

Duncan et al.

[11] Patent Number: 4,937,460

[45] Date of Patent: Jun. 26, 1990

[54] THICKNESS SENSOR

[75] Inventors: Eugene F. Duncan, Wauwatosa; Gregory L. Nadolski, Brookfield; Donald L. Van Zeeland, Franklin, all of Wis.

[73] Assignee: Eaton Corporation, Cleveland, Ohio

[21] Appl. No.: 378,546

[22] Filed: Jul. 11, 1989

[51] Int. Cl.$^5$ ............................................. G01N 21/86
[52] U.S. Cl. ...................................... 250/561; 271/263
[58] Field of Search ............. 250/222.1, 222.2, 223 R, 250/560, 561; 356/371; 271/262, 263

[56] References Cited

U.S. PATENT DOCUMENTS

| | | | |
|---|---|---|---|
| 3,176,981 | 4/1965 | Vandeman | 271/263 |
| 3,186,708 | 6/1965 | Hinz | 271/263 |
| 3,591,170 | 7/1971 | Doughty | 271/263 |
| 3,667,846 | 6/1972 | Nater et al. | 356/120 |
| 3,826,487 | 7/1974 | Forster et al. | 271/263 |
| 3,902,713 | 9/1975 | Von Lühmann et al. | 250/561 |
| 3,968,364 | 7/1979 | Miller | 250/561 |
| 3,993,303 | 11/1976 | Riedl et al. | 271/263 |
| 4,013,283 | 3/1977 | Tress et al. | 271/263 |
| 4,053,234 | 10/1977 | McFarlane | 356/156 |
| 4,078,784 | 3/1978 | Miaskoff et al. | 271/263 |
| 4,378,109 | 3/1983 | Takahashi et al. | 271/263 |
| 4,557,435 | 12/1985 | Reishus | 250/561 |
| 4,864,124 | 9/1989 | Mirabella, Jr. et al. | 271/263 |

*Primary Examiner*—David C. Nelms
*Assistant Examiner*—Stephone B. Allen
*Attorney, Agent, or Firm*—L. G. Vande Zande

[57] ABSTRACT

An optoelectronic triangulation sensor mounted adjacent a path of travel of a material web or individual paper sheets has a pivotable lever biased toward a fixed reference platen to bias the article(s) against the platen. The sensor light source is focused on a target carried on the back of the lever and reflected to a position-sensitive detector (e.g. lateral-effect photo-diode), the output of which varies in an analog signal in direct proportion to displacement of the lever. A relatively wide included angle between light source and PSD receiver shortens the range of the sensor and eliminates a need for pulse modulated light. The current driving the light source is monitored to emit a signal when the light source current exceeds a threshold, signaling the need for maintenance on the sensor such as cleaning the lens.

19 Claims, 3 Drawing Sheets

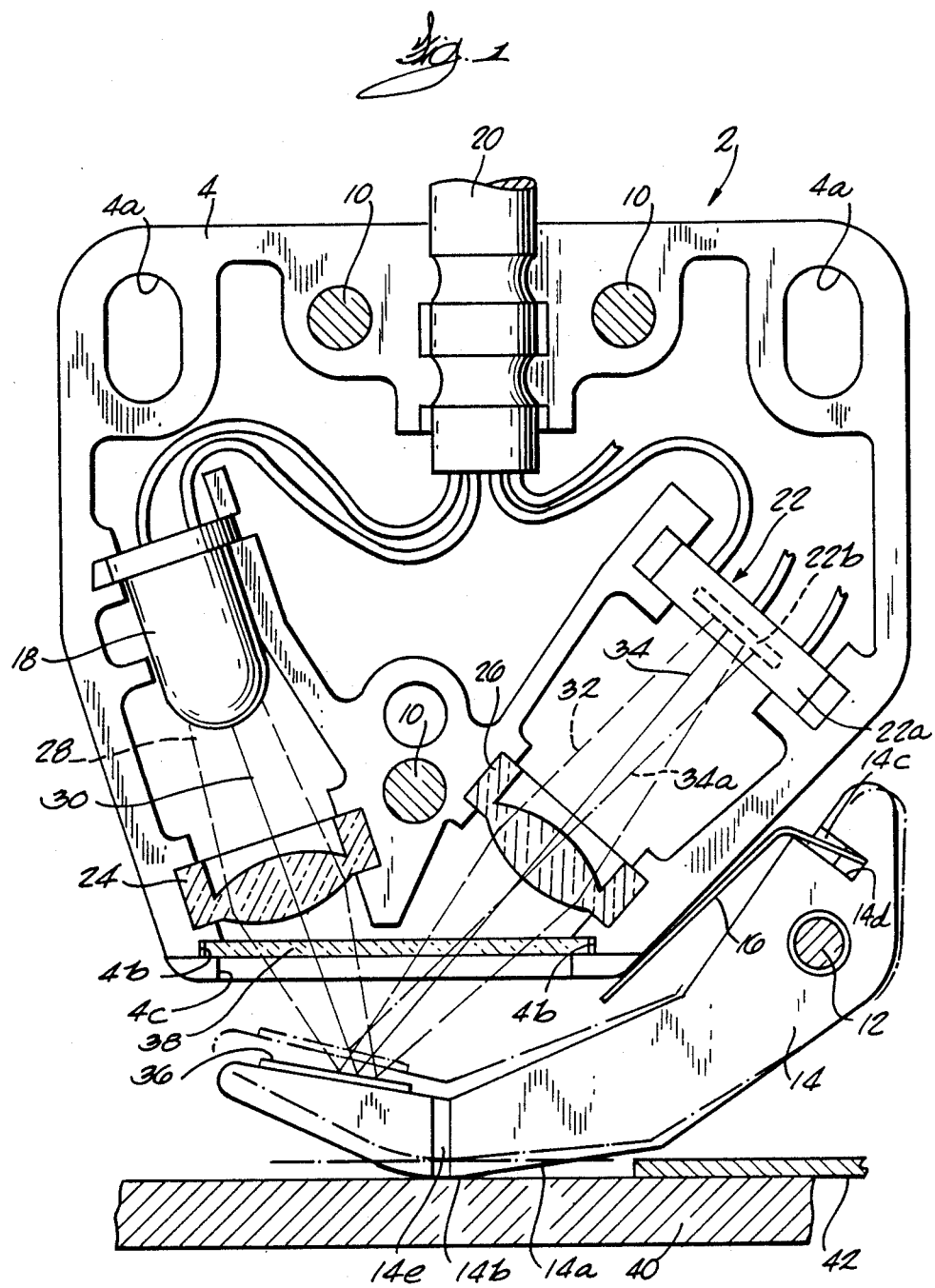

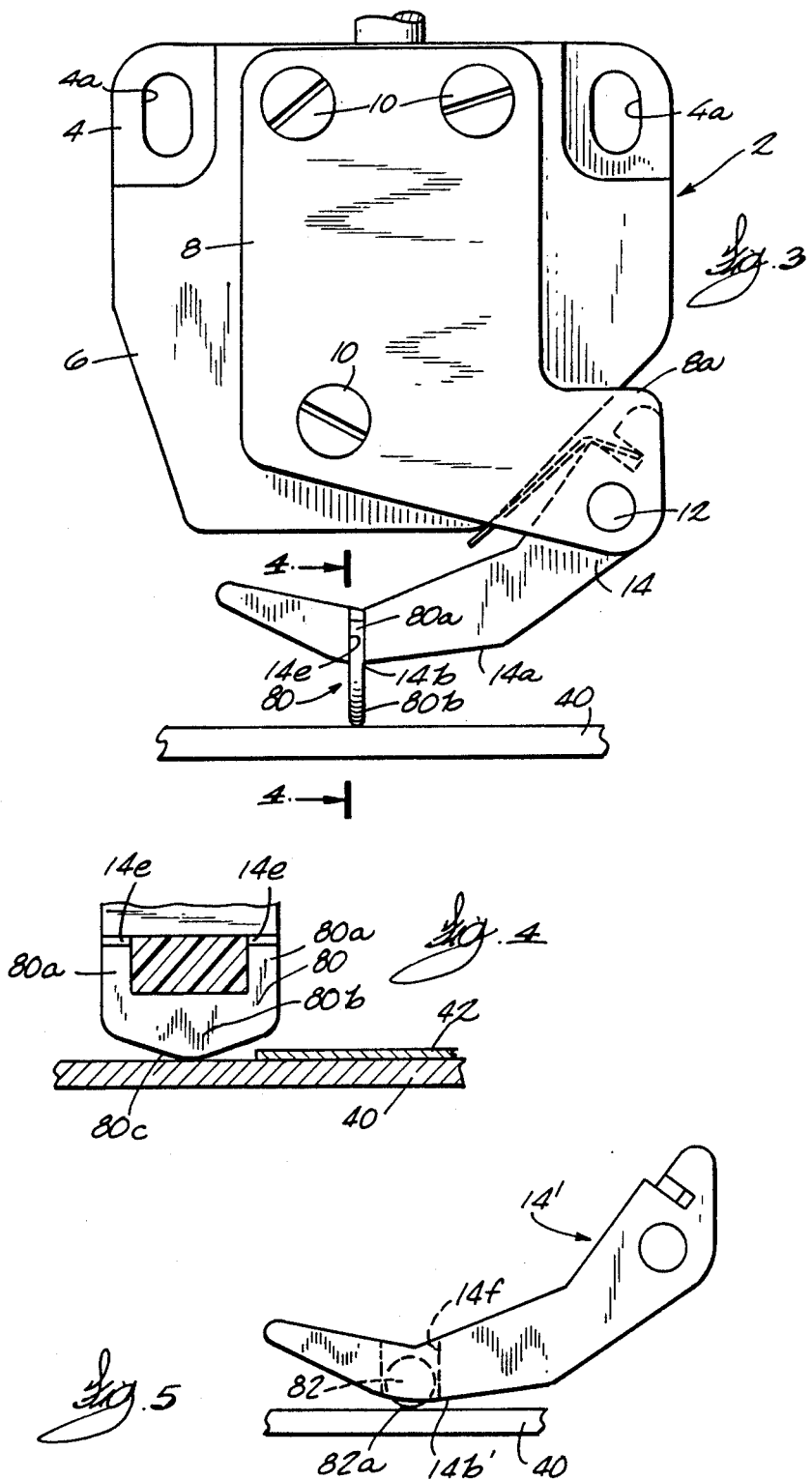

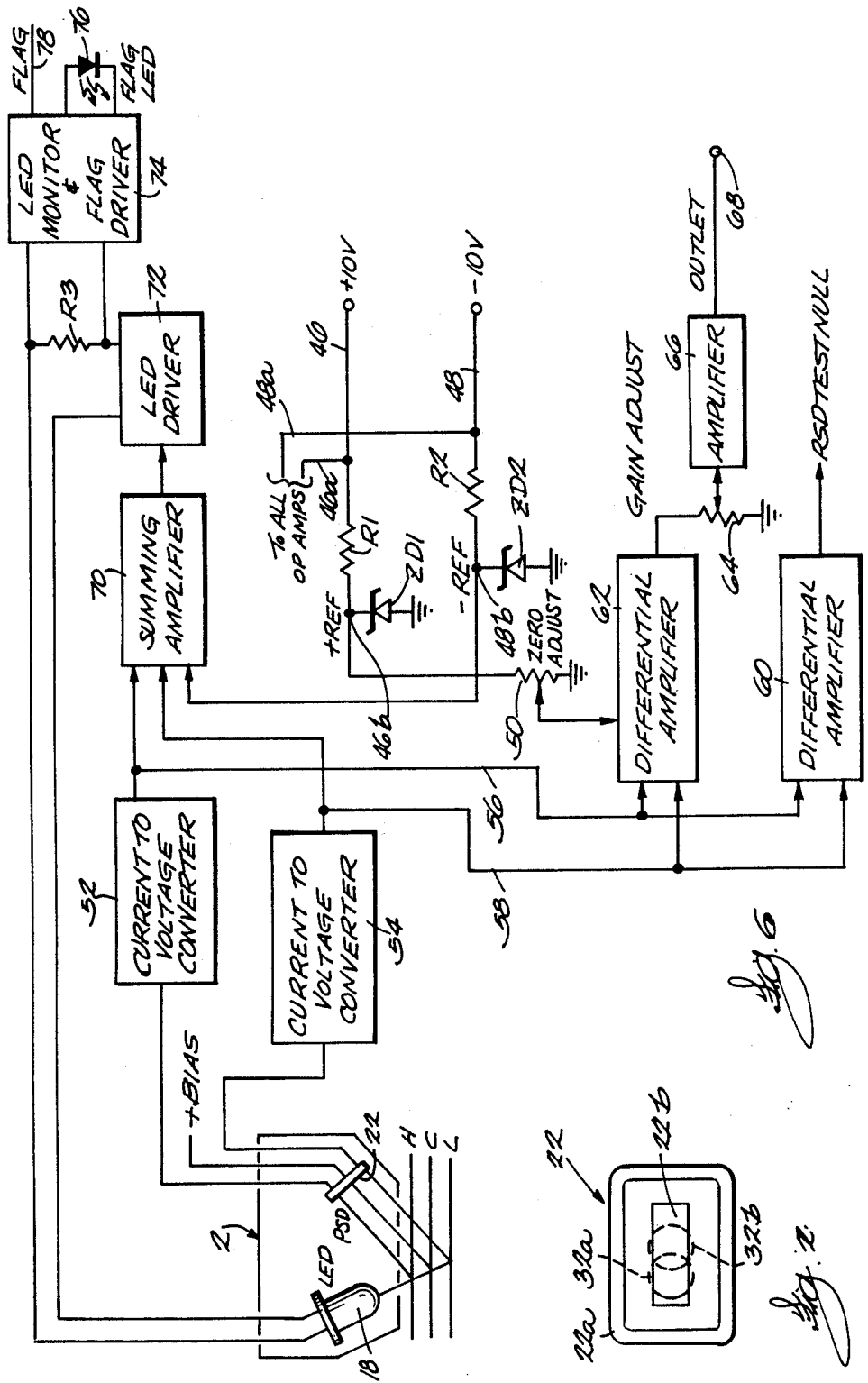

THICKNESS SENSOR

BACKGROUND OF THE INVENTION

This invention relates to sensors for measuring or monitoring the thickness of thin sheet material traveling along a fixed path adjacent the sensor. More particularly, this invention relates to sensors of the aforedescribed type which measure or monitor very thin articles such as thin sheets of paper or the like and can detect variations in thickness such as a double sheet fed along the path. Still more particularly, this invention relates to sensors of the aforementioned type which employ optoelectronic triangulation measuring means, and which utilize a pivoted lever to bias the articles against a stationary platen to establish a reference position for the sensor.

Sensors which monitor the thickness of a thin flexible web of material or of individual thin sheets, such as paper traveling along a known path, can also be used to detect an overlapped or multiple thickness condition of plural sheets of paper traveling along that path. Electromechanical and through-beam photoelectric sensors are commonly used for thickness monitoring but are generally unsuitable for detecting thin sheets of paper or thick card stock inasmuch as they are difficult to adjust for such accuracy. Optoelectronic triangulation sensors provide the desired accuracy to detect the thickness of thin sheets of paper and to distinguish a single sheet from two or more sheets. Such sensors optically measure the distance from a reference surface supporting the paper to the top surface of the paper. However, optoelectronic triangulation sensors are non-contact sensors and do not determine if the paper is in contact with the reference surface, but measure only the distance to the top surface of the reference platen and to the top surface of the paper. If the paper is above the reference platen, an inaccuracy results.

Inaccuracies can also result when sensing printed papers wherein the light emitted from the sensor is focused on the paper in areas having black print or images. When the focused light spot is in a white area, the center of the spot is its orthogonal center. As the spot is focused at least partially on a black printed area, the center shifts to an integrated center of the white portion of the spot. This degree of inaccuracy, although very small, is not acceptable in applications sensing papers having a thickness approximately 0.002 inches.

Still other disadvantages of available sensors of the aforementioned type are that they are slow, provide digital outputs and are expensive. Most such sensors require a pulse modulated light source which adds complexity and cost to the control circuit. Those which provide an analog output signal employ diode arrays which are sequentially scanned to determine the output signal.

This invention overcomes the aforedescribed disadvantages.

SUMMARY OF THE INVENTION

This invention provides a position-sensitive detector (PSD) type optoelectronic triangulation sensor for monitoring the thickness of one or more articles moving along a path over a stationary reference platen. The sensor has a pivotally mounted lever extending generally parallel to the path of the articles, a distal portion thereof bearing against the articles or the platen. Light emitted from the sensor is focused on a target surface of the lever. The optoelectronic triangulation sensor has a relatively wide included angle between the light source and the light receiver, which comprises the position-sensitive detector, to shorten the range of the sensor and to render movement of the focused light beam along the position-sensitive detector more directly proportional to movement of the lever. The shortened range provided by the wide angle triangulation pattern and the uniformity of the target surface on the lever renders the sensor satisfactorily operable with a steady state light source and does not require a more complicated pulse modulated light source. The constant uniformly opaque target surface on the lever prevents inaccuracies that might occur when the sensor is focused on the articles, such errors being caused by printed matter appearing on the surface of the articles, or by a changing target area from a glossy machine surface such as the reference platen to a matte finish surface on the articles. The lever is biased into contact with the articles to maintain them in contact with the reference platen and may be modified for contact with articles traveling at right angles to the plane of movement of the lever, thereby providing greater flexibility in mounting the sensor to equipment defining the article path of travel. Controlled excursion of the focused reflected light spot along a specific range on the PSD provides a linear analog output for the sensor having a high degree of accuracy and resolution. These and other advantages of the thickness sensor of this invention will become more readily apparent in the following specification and claims when read in conjunction with the accompanying drawings.

BRIEF DESCRIPTION OF THE DRAWINGS

FIG. 1 is a side view of the thickness sensor of this invention shown with a cover removed;

FIG. 2 is a side elevational view of a position-sensitive detector utilized in the thickness sensor of this invention;

FIG. 3 is a side elevational view of the thickness sensor of this invention showing a modification to the lever for use in applications where the direction of travel of articles in a path is transverse to the plane in which the lever pivots;

FIG. 4 is a cross sectional view taken along the line 4—4 in FIG. 3 showing the modified lever of FIG. 3;

FIG. 5 is a fragmentary view of the lever and a stationary reference platen showing another modified embodiment of the lever; and FIG. 6 is a block diagram of the electronic circuit of the thickness sensor of this invention.

DESCRIPTION OF THE PREFERRED EMBODIMENT

Referring to FIGS. 1 and 3, a thickness sensor 2 constructed in accordance with this invention has a housing 4 and a cover 6 secured together to retain other elements of the sensor in operable positions within a cavity of the housing by appropriate formations on interior surfaces of housing 4 and cover 6. A bracket 8 is also attached to the sensor 2 over the cover 6 as seen in FIG. 3, and the housing 4, cover 6 and bracket 8 are secured together by screws 10 or other suitable fastening means. Housing 4 is provided with a pair of elongated slots 4a for mounting the thickness sensor 2 to structure adjacent the path of travel of articles to be monitored. Bracket 8 has an offset leg 8a extending to one side of the assembled housing and cover of sensor 2. A pivot pin 12 is riveted to leg 8a of bracket 8 and projects rearwardly therefrom alongside the housing of sensor 2 as viewed in FIG. 3. It is contemplated that bracket 8 may be omitted leg 8a and pivot pin 12 be incorporated as integral elements of the housing 4.

A lever 14 is pivotally mounted on pivot pin 12 and is retained thereon by a C-clip or other suitable fastening means (not shown). Lever 14 has a shallow oblique surface 14a near a distal portion of the lever, which portion has a large radius that blends smoothly with surface 14a to provide a contact surface 14b for engagement with a stationary platen or with an article as will be hereinafter more fully described. Lever 14 has a notch 14c in its pivoted end, the notch 14c communicating with a near side of lever 14 adjacent bracket 8 and being closed at the far side. The web of material that defines the closed end of notch 14c is further provided with a recess 14d (FIG. 1). A substantially L-shaped leaf spring 16 has the short end of the L disposed in notch 14c and the long leg of the L extending along an external surface of housing 4 and cover 6, the spring 16 imparting a counterclockwise bias to lever 14. The end of the short leg of spring 16 has a tab (not shown) projecting from its far edge, which tab is received within recess 14d to retain the spring 16 assembled to lever 14. Bracket 8 closes off the near side of notch 14c to also prevent removal of the spring 16 from notch 14c.

An LED 18 is entrapped within a pocket in housing 4. Lead wires for LED 18 extend externally of the sensor through a sealed connector and cable 20. A position-sensitive detector 22 is similarly positioned within a pocket formed in housing 4, and its leads are similarly brought externally of the sensor through connector and cable 20. Position-sensitive detector (PSD) 22 is shown separately in FIG. 2 as a side elevational view. PSD 22 comprises a molded insulating frame 22a in which a lateral-effect photo-diode element 22b is molded in place. Frame 22a can be moved lengthwise within a pocket provided therefor in housing 4 for adjustment purposes during assembly of the thickness sensor, and then secured at the adjusted position by an epoxy or other suitable means. A pair of molded plastic lenses 24 and 26 are secured within pockets in housing 4 in respective optical alignment with LED 18 and PSD 22. LED 18 and lens 24 direct focused light represented by dashed lines 28 along an operative axis represented by line 30. Lens 26 focuses reflected light from LED 18 represented by dashed lines 32 upon the PSD photo-diode element 22b along an operative axis represented by line 34.

The operative axes 30 and 34 of the light source LED 18 and receiver PSD 22, respectively, are disposed at an included angle of approximately 60°. Such angle is uncommonly wide for optoelectronic triangulation sensors, but it effectively shortens the range of the light beam to the target and increases the excursion of a focused light spot on photo-diode element 22b when reflected from a target 36 on lever 14 in response to directly proportional movement of lever 14. Target 36 is preferably a piece of polyester material having a uniformly opaque surface which is affixed to lever 14 by an adhesive or the like. Alternatively, target 36 could be an integral surface of lever 14 if the lever is made by a molding process and suitable surface finish is provided in the area of the target. Machining marks in levers cut from a block of material have been found to render the target surface unsuitable for achieving the desired accuracy.

The lower end of housing 4 is provided with a slot 4b adjacent a window opening 4c. A transparent pane 38 is disposed in the slot to prevent dust and other contaminants from directly contacting the surfaces of lenses 24 and 26.

The sensor is mounted to an appropriate bracket or other structure adjacent a path in which a web of material or a plurality of articles such as individual sheets of paper are arranged to travel. A stationary platen 40 is also affixed to such structure to define a lower surface reference for the path of travel of the web or articles. Thickness sensor 2 is mounted in a specific fixed relationship to stationary platen 40 by placing a gage block between the lower edge of the housing of sensor 2 and the platen 40, sliding the sensor into engagement with the gage block and then tightening mounting bolts (not shown) which extend through elongated slots 4a to securely mount the sensor in place. When so mounted, the spring 16 urges contact surface 14b of lever 14 against the upper surface of platen 40.

Light from LED 18 is focused on target 36 as a spot centered about the operative axis 30. The emitted light is reflected from target 36 to PSD 22 and focused through lens 26 along an operative axis 34 as a spot on the surface of photo-diode element 22b. The focused reflected spot of light is initially focused near the left-hand end of photo-diode element 22b, as represented by circle 32a in FIG. 2, when lever 14 rests against the stationary reference platen 40. It will be noticed in FIG. 2 that the focused spot of light is slightly larger in diameter than the height of element 22b such that the upper and lower edges of circle 32a fall outside of the element 22b, but that the left and right-hand edges of circle 32a fall within the boundaries of the element. As an article, such as a sheet of paper 42 shown in FIG. 1, moves along the path defined by the upper surface of platen 40, it moves under lever 14, raising the lever to the dot-dash line position which places target 36 closer to LED 18 and closer to PSD 22. At this position, the operative axis 34 of the reflected light 32 is tipped clockwise to the displaced axis 34a, moving the focused spot to the right along photo-diode element 22b as represented by circle 32b in FIG. 2. The lateral excursion of the focused spot along photo-diode element 22b is substantially directly proportional to the movement of lever 14 from platen 40. If a second sheet of paper were to be fed through on top of sheet 42, the lever 14 would be raised an additional thickness of the sheet and the reflected light 32 would be focused further to the right on PSD photo-diode element 22b. This arrangement provides a very accurate means of measuring or monitoring the thickness of an article such as a web of material, or to determine if two individual articles, such as two sheets of paper, are being fed along the path as a double thickness.

A block diagram of the electronic system of thickness sensor 2 is shown at FIG. 6. Position-sensitive detector devices such as lateral-effect photo-diodes are semiconductors having an input terminal and two output terminals. A bias voltage is applied to the input terminal. A light spot incident on the position-sensitive detector generates an electric charge at the surface which collects as photo-current at the respective output terminals, the photo-current being universally proportional to the distance between the respective output terminal and the position of the incident light. The sum of the currents at both output terminals equals the current present at the bias terminal which is a constant value.

The system is supplied with a plus and minus 10 volt supply over wires 46 and 48. All operational amplifiers (op amps) of the system are supplied from the same plus and minus 10 volt supply over wires 46a and 48a. To compensate for irregularities in the power supply, a pair of zener controlled reference points 46b and 48b are established by voltage dropping resistors R1 and R2 in the respective lines ahead of zener diodes ZD1 and ZD2, respectively, providing a stabilized voltage of, for example, 6.2 volts for the remainder of the system.

With power supplied to the system, the device is adjusted by initially moving lever 14 to a center position to test PSD 22. Inasmuch as the photo-current at each terminal in inversely proportional to the distance between the respective terminal and the incident light spot, the signals from output terminals of PSD 22 will be equal when the light spot is focused at the center of PSD 22. Accordingly, the current signal into and the voltage signal out of the current to voltage converter 52 will be equal to the signal into and out of current to voltage converter 54. These voltage signals are applied over lines 56, 58 to differential amplifier 60 which responds to provide a "null" signal at its output terminal because the two signals cancel each other.

Next the lever 14 is moved to its low position, such as resting directly upon platen 40. Thus one output terminal of PSD 22 will have a large output signal and the other output terminal will be very low. The sum of the two is still constant, but one signal overpowers the other and must be offset. A zero adjust potentiometer 50 is provided for this purpose, applying a voltage signal of opposite polarity to the signal from the low side output terminal of PSD 22 to adjust the output of differential amplifier 62 to zero. After the zero adjust, the lever is moved to the high position 14 by inserting a gage block or the like under the lever. Gain adjustment potentiometer 64 is then adjusted to provide a desired output for the system at the output 68 of amplifier 66, the output 68 being the output for the thickness sensor 2 and being on the order of 5 volts. Inasmuch as the PSD 22 output is substantially linear as long as the focused spot does not travel off the ends of PSD 22, the system output will be linear from 0 to 5 volts representing, for example, 0.000 to 0.050 inches travel of the lever 14.

The system is also provided with a luminous feedback loop comprising a summing amplifier 70 and an LED driver circuit 72. The negative reference voltage from point 48b is fed into summing amplifier 70, as are the output voltage signals from current to voltage converters 52 and 54. The negative reference voltage signal forces the sum of the outputs of converters 52 and 54 to be constant at all times. When that sum is not constant, amplifier 70 adjusts the signal to LED driver 72 which in turn adjusts upward or downward the signal to LED 18 to drive the LED harder or softer to maintain the summed signals constant. It is not desirable, however, to drive LED 18 at 100% or more of its rated capacity in order to maintain the constant output. Increases in driving signals usually means the lens of the sensor is dirty and requires cleaning.

The thickness sensor of this invention is provided with an indicator or flag circuit 74 for indicating when the LED driver 72 is driving the LED 18 too hard, which suggests the sensor lens needs cleaning. A current sampling resistor R3 is connected in one of the lines to LED 18 from LED driver 72. Opposite sides of resistor R3 are connected to the monitor and flag driver circuit 74 which responds when the current to LED 18 exceeds a predetermined threshold, such as 70% of the rated input for LED 18, to energize a flag LED 76 providing a visual indication, and an output 78 which may be connected to a primary control panel for the system in which sensor 2 is used.

FIGS. 3, 4 and 5 show modifications to lever 14 that permit the thickness sensor 2 to be mounted on apparatus defining the path of travel of the articles wherein the lever pivots in a plane transverse to the direction of travel of the articles. In FIGS. 3 and 4, a pair of lateral slots 14e (also shown in FIG. 1) are formed in lever 14. A U-shaped skid plate 80 having upwardly extending legs 80a and a shallow V-shaped bight 80b is pressed into lever 14 with legs 80a disposed in slots 14e. The shallow V-shaped lower surface of bight 80b is smoothly rounded to create a contact surface 80c at right angles to the plane in which lever 14 pivots. The shallow angle of lever 14 as a whole, which from pivot pin 12 is nearly parallel to the path of the articles, readily allows the lever to respond to articles traveling in a direction transverse to the movement of the lever. A simpler modification to lever 14 for use in place of skid plate 80 shown in FIG. 5. A lever 14' has a round hole 14f in the area of contact surface 14b'. A ball 82 is pressed into hole 14f, projecting from the lower surface of the lever, to provide a spherical contact surface 82a for contact with the articles.

The foregoing has described a preferred embodiment of the thickness sensor of this invention. It provides an inexpensive apparatus, simple to manufacture and use, which is highly accurate, capable of measuring very thin articles, and is versatile in installations to operate on articles traveling therepast, regardless of direction. This sensor combines the advantages and precision of PSD triangulation optoelectronic sensing with a mechanical lever, placing a target on the lever to achieve performance superior to the PSD triangulation optoelectronic sensor. Although particular modifications have been described in conjunction with the lever for this sensor, it is to be understood that the entire invention is susceptible of still further modification without departing from the scope of the appended claims.

We claim:

1. Apparatus for monitoring the thickness of one or more articles moving along a path past said apparatus comprising:

a stationary platen defining a reference base for said path;

a pivotally mounted lever extending generally parallel to said path, a distal portion of said lever disposed in said path bearing against said platen and displaced from said platen by said one or more articles when said articles are present in said path; and optoelectronic triangulation means comprising a light source and position-sensitive detector receiving means fixed relative to said platen, a target on said lever, and control means connected to said light source and said position-sensitive detector receiving means, said light source emitting focused light on said target which is reflected and focused at different positions along said position-sensitive detector receiving means as said lever is displaced from said platen by said one or more articles, said position-sensitive detector receiving means producing a substantially linear analog output signal through said control means related to movement of said lever indicating the thickness of said one or more articles.

2. The apparatus defined in claim 1 wherein said lever is biased against said stationary platen and urges said one or more articles against said platen as said one or more articles move along said path.

3. The apparatus defined in claim 1 wherein said light source and said position-sensitive detector receiving means are operatively directed along converging lines defining an included angle greater than forty-five degrees.

4. The apparatus defined in claim 1 wherein said light source and said position-sensitive detector receiving means are operatively directed along converging lines defining an included angle approximately sixty degrees.

5. The apparatus defined in claim 1 wherein said light source is energized in a steady state.

6. The apparatus defined in claim 5 wherein said light source comprises an LED.

7. The apparatus defined in claim 6 wherein said LED emits infrared light.

8. The apparatus defined in claim 1 wherein said light source and said position-sensitive detector receiving means are operatively directed along converging lines defining an angle which effects a substantially direct relationship between displacement of said lever and displacement of said focused light along said position-sensitive detector receiving means.

9. The apparatus defined in claim 8 wherein said target comprises a smooth uniformly opaque integral surface of said lever.

10. The apparatus defined in claim 8 wherein said target comprises a smooth uniformly opaque surface affixed to said lever.

11. The apparatus defined in claim 8 wherein said analog output signal is directly proportional to displacement of said lever.

12. The apparatus defined in claim 1 wherein said control means comprises means driving said light source in response to a total output of said position-sensitive detector receiving means, and signaling means monitoring current to said light source providing at least one output signal upon said current exceeding a threshold value.

13. The apparatus defined in claim 12 wherein said output signal effects illumination of an indicating device.

14. The apparatus defined in claim 13 wherein said indicating device is a light emitting diode.

15. The apparatus defined in claim 13 wherein said output signal comprises a second signal connectable in control apparatus remote from said monitoring apparatus.

16. The apparatus defined in claim 1 wherein said lever is disposed to pivot in a plane transverse to direction of movement of said one or more articles in said path, and means are provided on said lever defining a projection having a surface smoothly contoured in said direction of movement of said one or more articles, said projection bearing against said platen or said one or more articles.

17. The apparatus defined in claim 16 wherein said means on said lever comprises a skid plate attached to said lever, said plate being oriented parallel to an axis on which said lever pivots and comprising opposed shallow oblique surfaces merging at a radiused apex.

18. The apparatus defined in claim 17 wherein said plate comprises a U-shaped member, legs of said member being received in slots in said lever and said oblique surfaces being formed on a bight portion of said U-shaped member.

19. The apparatus defined in claim 16 wherein said means on said lever comprises a ball inserted in an opening in said lever.

* * * * *